May 24, 1932. J. H. JAMES 1,859,587
PROCESS OF MAKING PARTIAL OXIDATION PRODUCTS
Original Filed Nov. 5, 1919
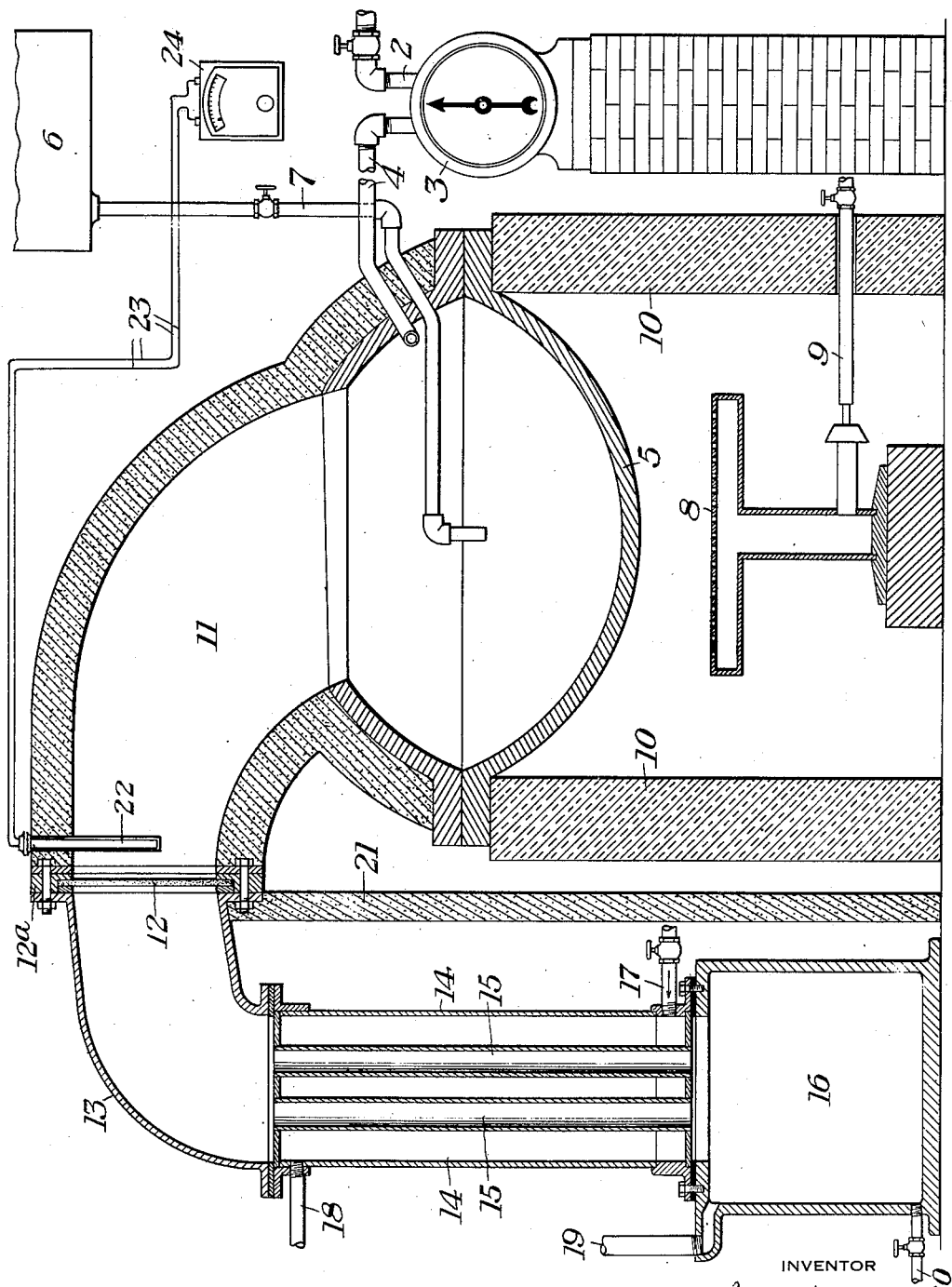
INVENTOR
J. H. James Patented May 24, 1932

1,859,587

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

PROCESS OF MAKING PARTIAL OXIDATION PRODUCTS

Original application filed November 5, 1919, Serial No. 335,939. Divided and this application filed October 28, 1925. Serial No. 65,379.

The figure is a sectional side elevation showing one form of apparatus for carrying out my invention.

In copending application Serial No. 272,567, filed January 22, 1919, and in Serial No. 281,124, filed March 7, 1919, I have described methods of making acids and also intermediate oxidation products short of acids by partial oxidation methods. In said methods, a mineral hydrocarbon in finely divided condition is mixed with oxygen or an oxygen-containing gas, such as air, and passed through a heated reaction zone, and preferably in contact with a catalyst under regulated temperatures, amount of air, etc., the temperature being kept under that of continuous self-sustained combustion and preferably below a red heat.

This application is a division of my application Serial No. 335,939, filed November 5, 1919 (now Patent No. 1,759,620, granted May 20, 1930), and relates particularly to a mixture of alcohols and to a method of making alcohols by my partial oxidation process. I have found that I can, by a process similar to those of the applications above enumerated, obtain alcohols and aldehyde alcohols from mineral hydrocarbons, which alcohols usually present in different molecular weights, can be further oxidized preferably by the same general process to obtain aldehyde fatty acids and other intermediate oxidation products.

This new method presents certain advantages over my other methods, both in that I can obtain, if desired, a relatively large percentage of alcohols, and also in that the double-run method, first making alcohols and then making aldehyde fatty acids therefrom, presents certain advantages over the direct method of producing aldehyde fatty acids.

In carrying out my process or subprocess, I may employ the same apparatus as shown in some of my copending cases, as shown in the figure of the drawing. In this drawing, 2 represents a valved air pipe through which air is supplied under pressure, 3 a meter for the air, and 4 the pipe leading from the meter into a heating and mixing vessel 5. 6 represents a vessel containing a hydrocarbon, preferably in liquid form, and 7 a valved pipe leading therefrom into the mixing vessel 5. 8 indicates a burner having a valved supply pipe 9, by which the heat may be regulated. 10 represents the walls of the furnace or heating chamber in which the retort or mixing vessel 5 is set, the heated mixture of hydrocarbon vapor and air passing from the mixing vessel through the channel 11 to the catalytic screen 12. This catalytic screen is shown as having a frame 12a, clamped or bolted between the ends of the channel 11 and the flanged end of the conduit 13, leading to a vertical condenser 14. The products emerging from the catalytic screen pass down through the tubes 15 of the condenser into the vessel 16. 17 represents the valved inlet pipe for water passing into the condenser, and 18 the outlet pipe for the circulating water. The vessel 16 is provided with an outlet 19 for fumes, 20 being the valved pipe by which the condenser products are drawn off. Between the condenser and the vessel 16 and the furnace, I preferably provide an insulating screen 21 or some heat insulator, to keep the heat of the furnace away from the condensing apparatus.

22 represents a pyrometer which is preferably in the form of an electric couple with its wires 23 leading to an external temperature indicator 24.

As regards the catalyst employed, I prefer the complex oxides or compounds of metals having a varying valence. All parts of the complex may consist of oxides of the same metal or of different metals. For example, an excellent catalyst in this connection consists of the so-called "blue oxides" of molybdenum, which contain molybdenyl molybdenate, $MoO_2.MoO_3$ and molybdenyl molybdenite, and are preferably all chemical compounds of two or more oxides of molybdenum representing different states of oxidation. These complexes may be regarded as salts, that is, compounds of one of more basic with one or more acid oxides.

Other complexes of value for such catalyst are chromic chromate, $Cr_2O_3.CrO_3$, tungsten tungstate, $Wo_2.WO_3$, the manganese complexes, the vanadium complexes, etc., The basic and acid parts of these complexes may be formed from oxides of different metals, in which case, each metal or group of metals used should possess varying valence. Examples of this class are: uranyl molybdate; uranyl molybdite, cobalt molybdate; cobalt molybdite; uranyl vanadate; uranyl vanadite, etc.

The metals whose complexes I prefer to employ as the acid part of the catalyst, since I have found them to be of high activity in this field, are the high melting, electro-negative, low-atomic-volume metals having an atomic weight above 40. Those metals appear on the Lother Meyer diagram of the periodic series beginning on the descending side of the third peak, descending side of the fourth peak, and the descending side of further peaks, developed since the date of this diagram. The class includes the following metals: titanium, vanadium, chromium, manganese, zirconium, niobium, molybdenum, tantalum, tungsten and uranium. The basic oxides may be the lower oxides of these metals or may be the oxides of iron, copper, nickel, lanthanum, cobalt, thorium, and the eight or nine rare earth metals.

In both acid or basic portions there may, of course, be two or more of these combined.

In carrying out the process, the vapor of mineral oil is mixed with air in proper proportions and passes with a definite velocity through the thin layer of catalytic material which is maintained within a definite range of temperature below that of self-sustained combustion, and preferably below any temperature at which the catalyst will glow or show color from its rising temperature. Heat is continuously supplied to the heated zone of reaction sufficient to maintain it below that at which self-sustained combustion takes place, but sufficient to maintain the temperature to produce the alcohols.

In the preferred form of the present method, the essential difference over my previous methods lies in using much less air in the mixture than theory requires to make a product in which aldehyde acids will predominate and employing a temperature generally higher than used in producing aldehyde acids.

The following example will serve to illustrate my method under certain conditions. The raw material used was gas oil made from Pennsylvania petroleum, which showed the following on distillation:

| | |
|---|---|
| Below 250° C | Zero % |
| Below 300° C | 32.5% |
| Below 350° C | 62.% |
| Residue | 5.5% |

During the run, the oil was fed at an average rate of slightly over 5 liters every ½ hour; the air was fed at an average of about 4.4 cubic feet per minute, and the temperature in the catalytic zone was maintained at a temperature varying from about 340° to 470° C. The total oil fed was 92.5 liters, the total recovery with one scrubber was 71.5 liters, giving a yield of 76.9% of product having a specific gravity of .866.

By the well known method of determining aliphatic alcohols which consists in measuring the hydrogen evolved on heating with soda lime and caustic potash, it was found that the product contained approximately 33% of alcohol. The aldehyde fatty acids formed at the same time amount to about 17%. The remainder of the products consists of aldehydes and unchanged hydrocarbons. The determination of aldehydes and aldehyde alcohols was not made, but it was shown qualitatively that there was a considerable quantity of aldehyde bodies present, aside from the aldehyde fatty acids.

If the alcohols and aldehyde alcohols thus produced are to be converted into aldehyde fatty acids, I take the mixture produced by the step above described, containing the large percentage of alcohols, and pass it again through the apparatus in the same general manner as before. I will now recite an example of such sub-process or second step in the process of making aldehyde fatty acids.

The raw material made was the liquid product produced as above described containing aliphatic aldehyde alcohols, aldehydes, aldehyde fatty acids, and some unchanged aliphatic hydrocarbons. The temperature was from about 340° C. to 370° C. The oil feed was about 5.33 liters per one-half hour. The air feed was about 4.35 cubic feet per minute. The total oil fed was 32 liters and the product recovered with one scrubber in series with the condenser was 26.7 liters, giving a yield of 83.4%, the product having a specific gravity of .90. The aldehyde fatty acids in the product amounted to 55.6%.

The advantages of my invention will be apparent to those skilled in the art, since a simple, cheap and effective method is provided for making alcohols direct from mineral hydrocarbons and also a double-step method of producing further products, such as aldehyde fatty acids.

Changes may be made in the apparatus, as well as in the distillates or oils used, and the conditions may be varied somewhat within the lines above indicated, without departing from my invention.

Among the raw materials used I intend to include crude mineral oil or shale oil or their distillates or the products of low temperature distillation of lignites or coals which contain aliphatic hydrocarbons of both the saturated and unsaturated type, along with cyclic hydrocarbons and those of the ring type.

Other synthetic methods may be employed for preparing the oxygenated hydrocarbon derivative product claimed herein; and said methods are preferably of the catalytic type under temperatures sufficient to cause a reaction between the carbon compounds treated to form the hydrocarbon derivative product.

I claim:

1. In the process of making partial oxidation products, the steps consisting of mixing an oxygen-containing gas with finely divided hydrocarbon which is liquid at normal temperatures and pressures, passing a stream of the mixture through a hot reaction zone at a temperature below that of continuous self-sustained complete combustion, interadjusting the variable factors to produce a material percentage of alcohols, and condensing part of the products.

2. In the process of making partial oxidation products, the steps consisting of mixing vaporized hydrocarbon liquids with an oxygen-containing gas, supplying the latter in measured amounts less than theory requires for producing acids, passing the stream of the mixture through a hot reaction zone at a temperature below a red heat, adjusting the variables to produce a material percentage of alcohols, and condensing the products.

3. In the process of making partial oxidation products, the steps consisting of mixing vaporized hydrocarbon liquids with an oxygen containing gas, supplying the latter in measured amounts less than theory requires for producing acids, passing the stream of the mixture through a hot reaction zone at a temperature below a red heat and at a pressure below five atmospheres, adjusting the variables to produce a material percentage of alcohols, and condensing the products.

4. In the process of making partial oxidation products, the steps consisting of mixing vaporized hydrocarbon liquids with an oxygen-containing gas, supplying the latter in measured amounts less than theory requires for producing acids, passing the stream of the mixture through a hot reaction zone over catalytic material at a temperature below a red heat, adjusting the variables to produce a material percentage of alcohols, and condensing the products.

5. In the process of making aliphatic alcohols, the steps consisting in passing a vapor or gaseous phase mixture of aliphatic hydrocarbon and oxygen-containing gas through a heated conversion zone with the oxygen below that theoretically necessary for producing acids, and interadjusting the variable factors to give a material percentage of alcohols.

6. In the process of making aliphatic alcohols, the steps consisting in passing a gaseous or vapor phase mixture of aliphatic hydrocarbon and oxygen-containing gas in contact with a catalyst at a temperature below that of continuous self-sustained complete combustion, and interadjusting the variable factors to give a material percentage of alcohols in the product.

7. In the process of making partial oxidation products, the steps consisting of mixing an oxygen-containing gas with finely divided hydrocarbon which is liquid at normal temperatures and pressures, passing a stream of the mixture through a hot reaction zone at a temperature below that of continuous self-sustained complete combustion, interadjusting the variable factors to produce a material percentage of alcohols of different molecular weights, and then further oxidizing a product thereof to more highly oxidized products within the range from alcohols to organic acids.

8. In the process of making partial oxidation products, the steps consisting of mixing an oxygen-containing gas with finely divided hydrocarbon which is liquid at normal temperatures and pressures, passing a stream of the mixture through a hot reaction zone at a temperature below that of continuous self-sustained complete combustion, interadjusting the variable factors to produce a material percentage of alcohols of different molecular weights, and then mixing the product with an oxygen-containing gas and passing a stream of the mixture through a reaction zone at a temperature below that of continuous self-sustained complete combustion and within the range where further oxidation takes place.

9. In the process of making partial oxidation products, the steps consisting in passing a gaseous or vapor phase mixture of aliphatic hydrocarbon and oxygen-containing gas in contact with a catalyst, at a temperature below that of continuous self-sustained complete combustion, interadjusting the variable factors to give a material percentage of alcohols of different molecular weights in the product and then further oxidizing a product thereof to more highly oxidized products within the range from alcohols to organic acids.

In testimony whereof I have hereunto set my hand.

JOSEPH HIDY JAMES.